United States Patent [19]

Ichimura

[11] Patent Number: 5,673,158
[45] Date of Patent: Sep. 30, 1997

[54] SHOCK ABSORBING DEVICE FOR A MAGNETIC DISK DRIVE

[75] Inventor: Masaru Ichimura, Ibaraki, Japan

[73] Assignee: NEC Corportion, Japan

[21] Appl. No.: 502,899

[22] Filed: Jul. 17, 1995

[30] Foreign Application Priority Data

Jul. 20, 1994 [JP] Japan .................. 6-168133

[51] Int. Cl.⁶ ......................................... G11B 17/02
[52] U.S. Cl. ......................................... 360/97.01
[58] Field of Search ..................... 360/97.01–97.04; 369/75.1, 247, 263

[56] References Cited

U.S. PATENT DOCUMENTS

| | | | |
|---|---|---|---|
| 4,150,406 | 4/1979 | Stollorz | 360/133 |
| 4,553,231 | 11/1985 | d'Alayer de Costemore d'Arc | 369/247 |
| 4,713,714 | 12/1987 | Gatti et al. | 360/97.01 |
| 5,004,207 | 4/1991 | Ishikawa et al. | 360/97.02 |
| 5,079,655 | 1/1992 | Yagi | 360/97.01 |
| 5,349,486 | 9/1994 | Sugimoto et al. | 360/97.03 |
| 5,379,990 | 1/1995 | Ando et al. | 369/247 |
| 5,400,196 | 3/1995 | Moser et al. | 360/97.02 |
| 5,532,993 | 7/1996 | Yanagisawa et al. | 360/97.02 |

FOREIGN PATENT DOCUMENTS

| | | | |
|---|---|---|---|
| 63-204580 | 8/1988 | Japan | 360/97.02 |
| 1-14786 | 1/1989 | Japan | 369/291 |

*Primary Examiner*—Robert S. Tupper
*Assistant Examiner*—Allen Cao
*Attorney, Agent, or Firm*—Hayes, Soloway, Hennessey, Grossman & Hage, P.C.

[57] ABSTRACT

In a magnetic disk drive, a shock absorbing device has recesses formed in the base of the disk drive, and elastic shock absorbing members respectively fitted in the recesses. In an unstressed position, the highest point or apex of each shock absorbing member is higher than a mount face in which the recess is formed. A suitable gap exists between the outer periphery of the shock absorbing member and the inner periphery of the recess. When the base of the disk drive is affixed to the housing of a system body, the shock absorbing member is deformed and is fully received in the recess because of the gap. When the disk drive is caused to fall down by accident, the shock absorbing device reduces the impact to be imparted to mechanisms mounted on the base.

2 Claims, 3 Drawing Sheets

SHOCK ABSORBING DEVICE FOR A MAGNETIC DISK DRIVE

BACKGROUND OF THE INVENTION

The present invention relates to a magnetic disk drive and, more particularly, to a shock absorbing device for reducing, when the disk drive is caused to fall down by accident, the impact to be imparted to mechanisms mounted on the disk drive.

A conventional magnetic disk drive lacks a shock absorbing device for reducing, when the disk drive falls down by accident before it is mounted to the body of a computer system or similar system, the resulting impact to be directly imparted to mechanisms mounted on the disk drive. Hence, when the disk drive being handled alone is inadvertently caused to fall down on the floor or the like, an excessive degree of impact acts on the disk drive. The impact is apt to cause magnetic heads built in the disk drive to hit against magnetic disks and damage them. To eliminate this problem, shock absorbing members may be directly mounted on the outer periphery of the housing of the disk drive. However, such shock absorbing members would obstruct a procedure for mounting the disk drive to the system body.

SUMMARY OF THE INVENTION

It is, therefore, an object of the present invention to provide a shock absorbing device for a magnetic disk drive and capable of absorbing, when the disk drive being handled alone is caused to fall down, the resulting shock by deforming elastic shock absorbing members and thereby reducing the impact to be imparted to magnetic heads and magnetic disks.

It is another object of the present invention to provide a shock absorbing device for a magnetic disk drive and capable of allowing the disk drive to be fastened to a system body without any obstruction by causing elastic shock absorbing members to be deformed and fully received in recesses by the fastening force.

A shock absorbing device for a magnetic disk drive of the present invention has shock absorbing members respectively received in recesses formed in each of the right and left edges of the outside surface of the base of the magnetic disk drive. The highest point of each shock absorbing member fitted in any one of the recesses is higher than a mount face in which the recess is formed. A gap exists between the inner periphery of the recess and the outer periphery of the shock absorbing member. The shock absorbing members are fully received in the respective recesses by being deformed when the base is fastened to the housing of a system body.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
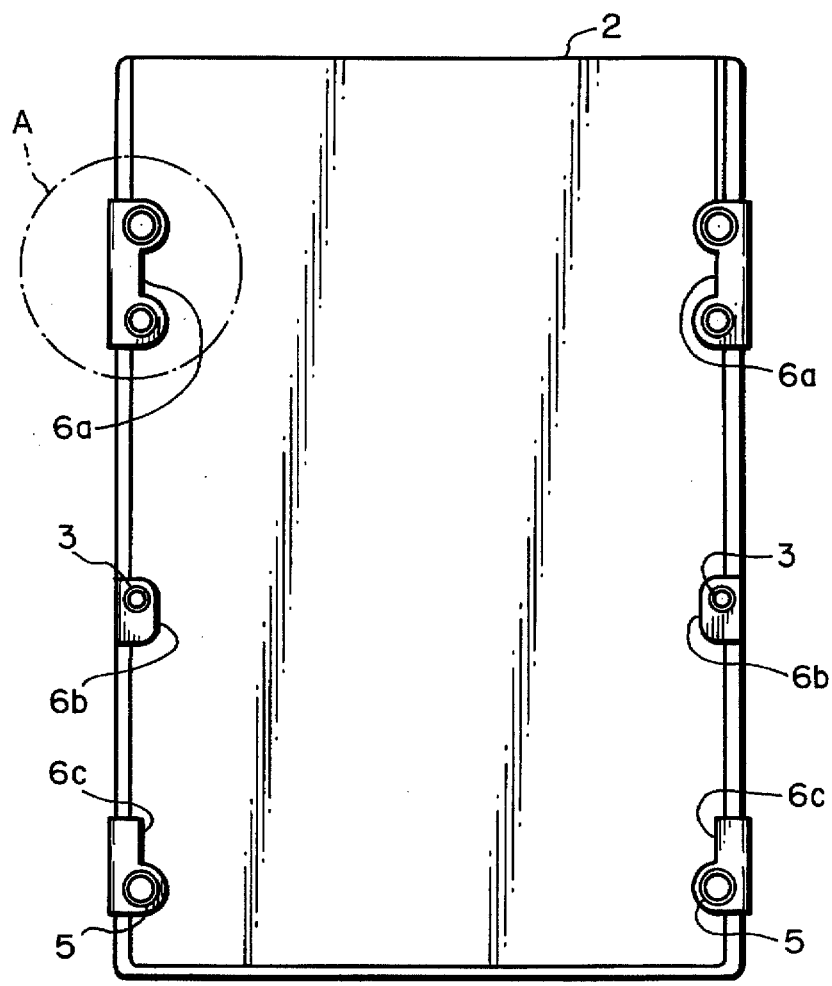
FIG. 1 is a bottom view of a base forming part of the housing of a magnetic disk drive to which the present invention is applied.
Figure 2:
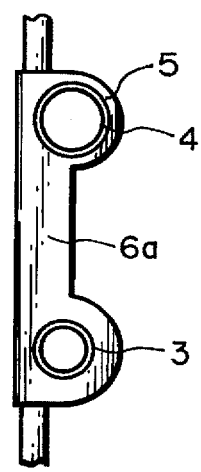
FIG. 2 is an enlarged bottom view of part of the base labeled A in FIG. 1.
Figure 3A:
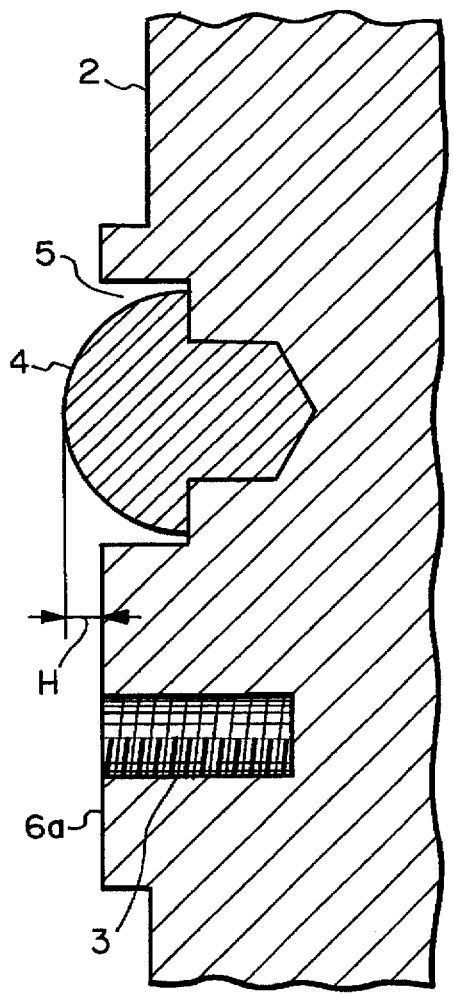
FIG. 3A is a section showing a shock absorbing device embodying the present invention and not mounted to the housing of a system body.
Figure 3B:
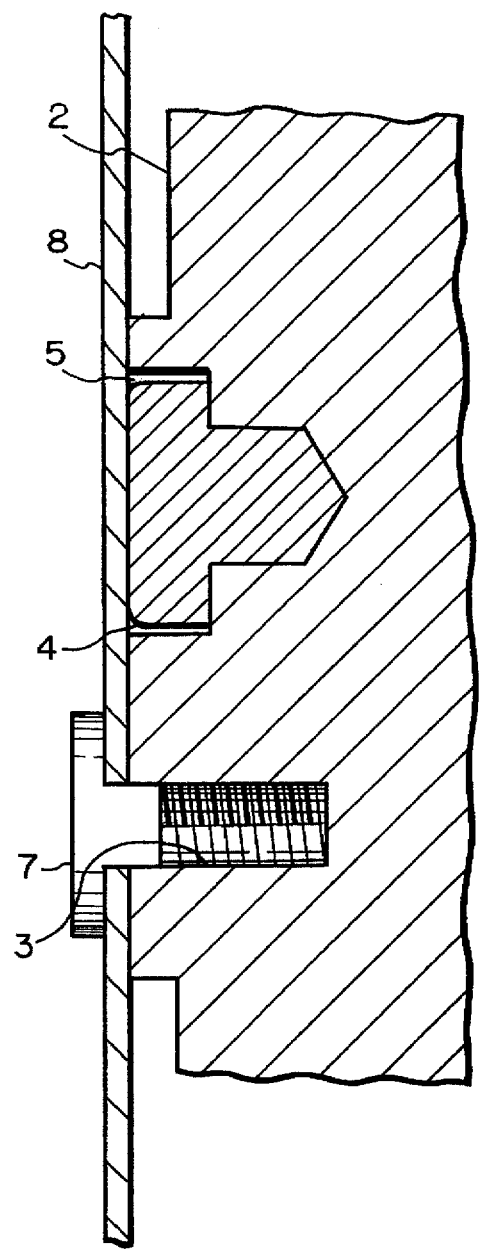
FIG. 3B is a view similar to FIG. 3A, showing the shock absorbing device mounted to the housing of the system body.

Referring to FIG. 1 of the drawings, there is shown a base forming part of the housing of a magnetic disk drive to which the present invention is applied. FIG. 3 is an enlarged view of part of the base labeled A in FIG. 1. The base is loaded with magnetic heads and magnetic disks, not shown, included in the disk drive. As shown in FIG. 1, the base, generally 2, has three spaced mount faces 6a, 6a and 6c at each of the right and left edges of the outer surface thereof opposite to the inner surface for mounting the heads and disks. The outer surface of the base 2 will contact, when the disk drive is mounted to the body of a computer system or similar system, the housing of the system body. As shown in FIG. 2, the mount face 6a is formed with a recess 5 for fitting a shock absorbing member 4 (see FIGS. 3A and 3B also) formed of urethane rubber, fluorine-contained resin or similar elastic material. In addition, the mount face 6a is formed with a threaded hole 3 for affixing the base 2 to the housing of the system body. On the other hand, the mount face 6a is formed only with the threaded hole 3 while the mount face 6c is formed only with the recess 5.

FIGS. 3A and 3B show a shock absorbing device embodying the present invention. As shown in FIG. 3A, the shock absorbing member 4 is fitted in each of the recesses of the mount faces 6a and 6c. In this condition, the highest point or apex of the member 4 is higher than the mount face 6a or 6c (height H). A suitable gap exists between the outer periphery of the member 4 and the inner periphery of the recess 5. Hence, as shown in FIG. 3B, when a screw is driven into the threaded hole 3 to affix the base 2 to the system body, the member 4 is fully received in the recess 5 despite its deformation.

Figure 4:
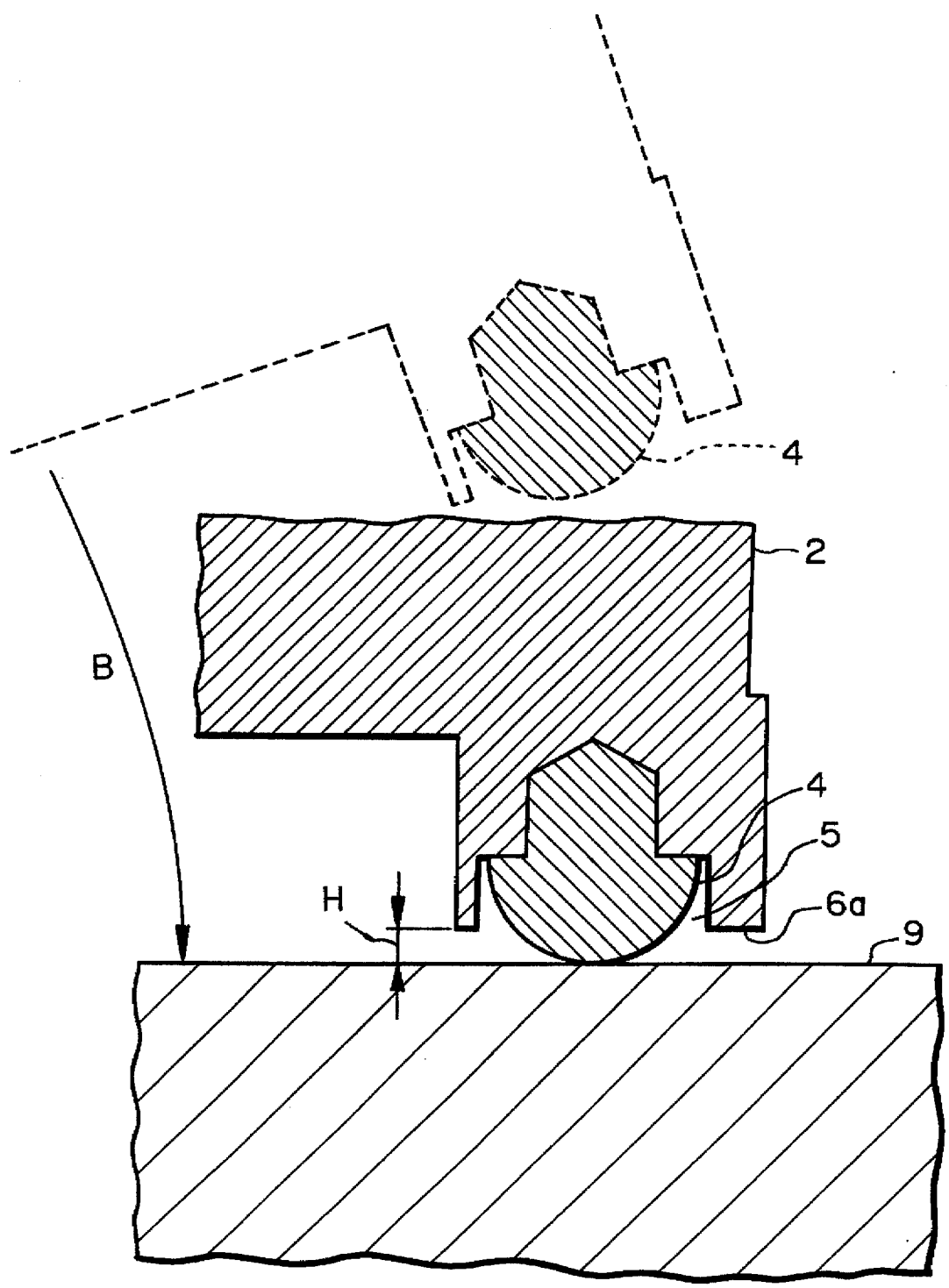
FIG. 4 is a section demonstrating the operation of the embodiment.

The shock absorbing device having the above configuration operates as follows. When the disk drive is handled alone, the shock absorbing member 4, in an unstressed position, protrudes from the mount face 6a or 6c at its apex portion, as shown in FIG. 3A. Assume that the disk drive in the condition of FIG. 3A is caused to fall down by accident, as indicated by an arrow B in FIG. 4. Then, the apex of the member 4 hits against a desk or similar pedestal 9, as shown in FIG. 4. Hence, the mount face 6a (or 6c) is prevented from directly contacting the pedestal 9. As a result, the member 4 deforms and absorbs energy attributable to the shock. This successfully reduces the impact to be transferred to the heads and disks mounted on the base 2.

As shown in FIG. 3B, to affix the disk drive to the system body, the screw 7 is driven into the threaded hole 3 so as to affix the base 2 to a housing 8. At this time, the shock absorbing member 4 is deformed by a pressure exerted by the housing 8. Consequently, the member 4 is fully received in the recess 5 and does not obstruct the mounting operation at all.

In the embodiment, the mount face is 6b formed only with the threaded hole 3. Alternatively, the mount face 6b may also be provided with the recess 5 in addition to the threaded hole 3. Then, the base 2 will have three shock absorbing members 4 at each of the right and left edges thereof.

In summary, it will be seen that the present invention provides a shock absorbing device for a magnetic disk drive and having the following advantages.

(1) When the disk drive being handled along is caused to fall down by accident, shock absorbing members hit against a pedestal and deforms. As a result, the members absorb energy resulting from the shock and thereby reduces the impact to be imparted to magnetic heads and magnetic disks mounted on the disk drive.

(2) When the disk drive is mounted to a system body, the shock absorbing members are deformed and fully received in respective recesses. Hence, the members do not obstruct the mounting operation at all.

Various modifications will become possible for those skilled in the art after receiving the teachings of the present disclosure without departing from the scope thereof.

What is claimed is:

1. A shock absorbing device for a magnetic disk drive, comprising:

shock absorbing members respectively received in a plurality of recesses formed in each of a right and a left edge of an outside surface of an enclosure housing of the magnetic disk drive, such that a portion of each of said shock absorbing members fitted in one of said plurality of recesses extends beyond the outside surface in which the recess is formed;

each of said recesses being dimensioned so that a gap is formed between an inner periphery of each of said recesses and an outer periphery of the respective shock absorbing member;

said extending portion of said shock absorbing members being fully received in said respective recesses by being deformed into said gap when said enclosure is fastened to a casing via fastening means located on the same surface of said housing as said shock absorbing members.

2. A device as claimed in claim 1, wherein said recesses and said shock absorbing members respectively comprise two recesses and two shock absorbing members formed at each of said right and left edges.

* * * * *